I. BABBITT.
Ore Amalgamator.
No. 5,545.
2 Sheets—Sheet 1.
Patented May 2, 1848.
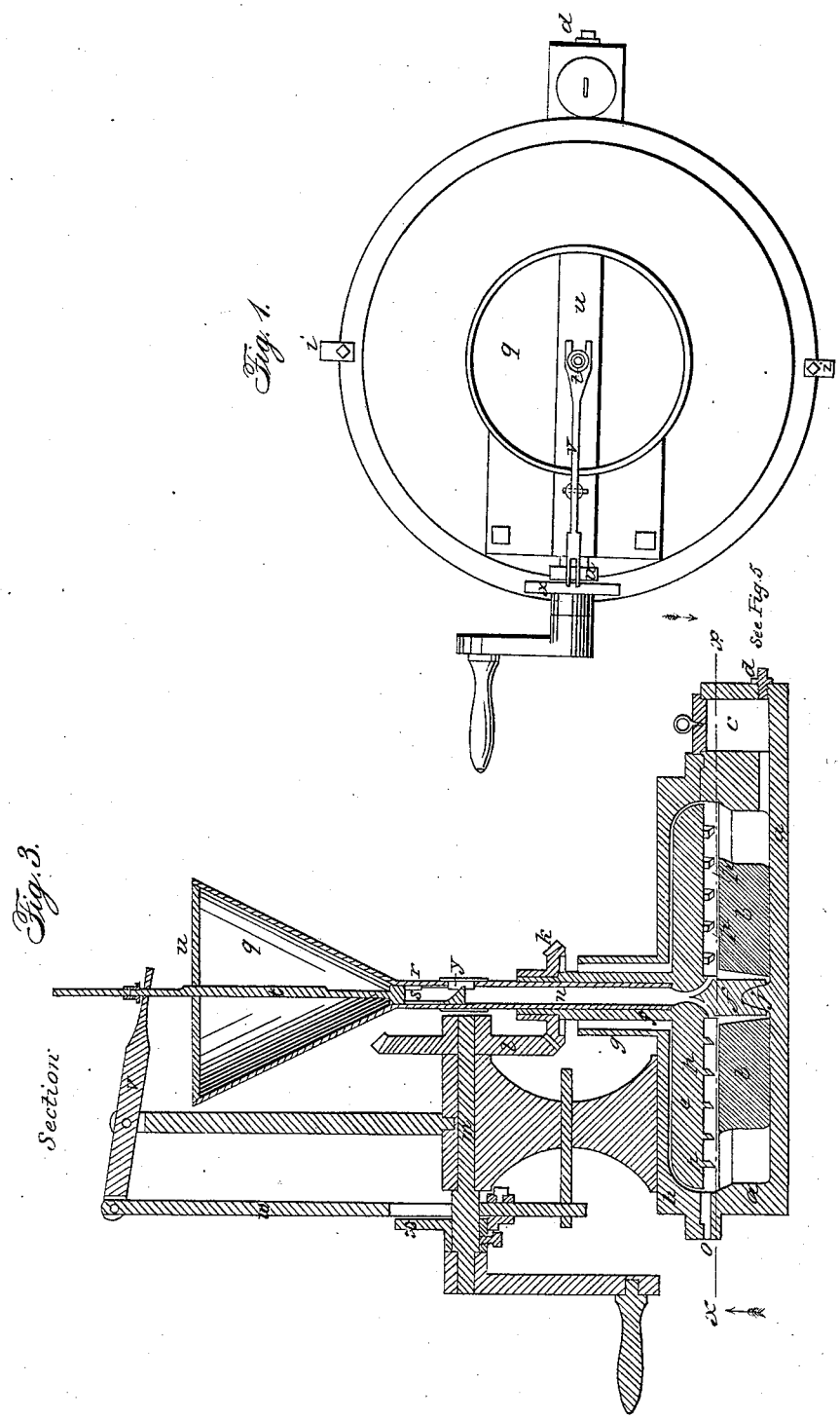

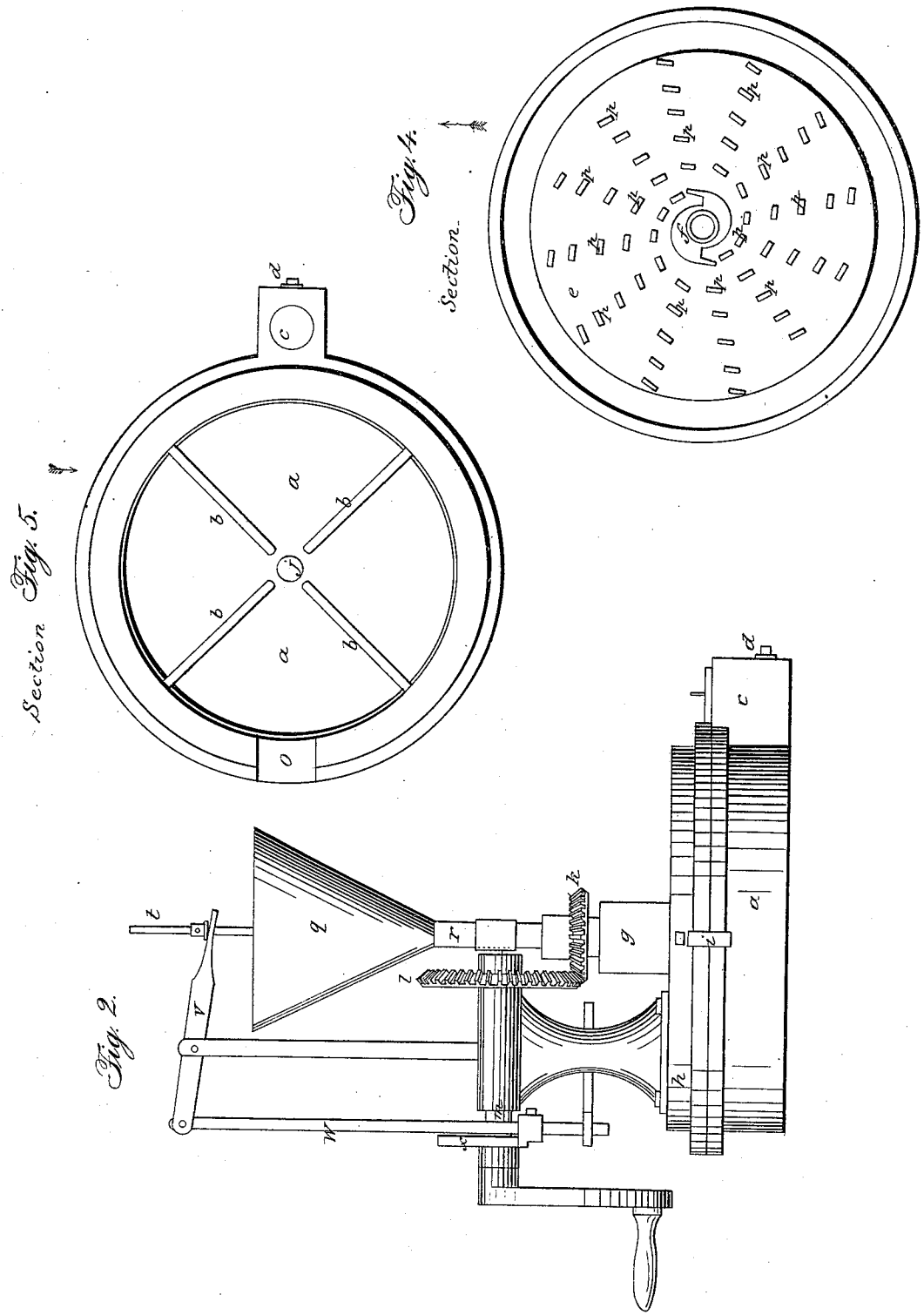

UNITED STATES PATENT OFFICE.

ISAAC BABBITT, OF BOSTON, MASSACHUSETTS.

IMPROVEMENT IN MACHINERY FOR SEPARATING GOLD.

Specification forming part of Letters Patent No. 5,545, dated May 2, 1848.

*To all whom it may concern:*

Be it known that I, ISAAC BABBITT, of Boston, in the county of Suffolk and State of Massachusetts, have discovered or invented a new and useful Process for the Separation of Gold from the Ores or from any Foreign Matter with which it may be Mixed, and in the apparatus for the application of the said process, which process and apparatus may be applied to silver and other metals; and I do hereby declare that the following is a full, clear, and exact description of the principle or character which distinguishes it from all other things before known, and of the manner of making, constructing, and using the same, reference being had to the accompanying drawings, making part of this specification, in which—

Figure 1 is a plan of the apparatus; Fig. 2, an elevation; Fig. 3, a vertical section, and Figs. 4 and 5, horizontal sections taken at the line X X of Fig. 3, and looking in the direction of the arrows.

The same letters indicate like parts in all the figures.

*Of the process.*—The nature of my invention or discovery consists in the causing of the gold or silver which is to be separated from the ore, or from other foreign or extraneous matter with which it is mixed or combined, to form an alloy with lead, instead of amalgamating these metals by means of mercury, as has heretofore been practiced, and this I effect by taking the ore of the metal, duly pulverized and washed, or pulverized only, as may be found most convenient, in which I govern myself according to the nature of the ore and other attendant circumstances; or I take the sweepings or other admixtures of the precious metals and prepare them, by burning, washing, or other known means, for the more easy combination of the contained metal or metals with the lead.

The apparatus which I employ, or which may be employed, may be constructed in various ways, and I do not intend, therefore, by my description, which I may give, to limit myself in this particular, or to claim as of my invention any particular form or combination of said apparatus, all that is necessary to the completion of the process being that the pulverized ore or other admixture of the precious metals with foreign matter, duly prepared, be put into a suitable vessel of iron, or of other material, together with a portion of metallic lead and of charcoal, sal-ammoniac, or other deoxidizing substance or flux which will protect the lead when brought into a state of fusion, and prevent its being converted into an oxide. This vessel, or recipient of the lead, ore, and flux, is to be so formed that the contained materials can be secured by a cover from the action of the air of the atmosphere while it is subjected to a red heat, which will fuse the lead and bring it into a state in which it will readily combine with precious metals when the vessel is made to revolve or is otherwise agitated, so as to bring the whole of the pulverized material into contact with the fused lead.

A very convenient mode of forming this alloying apparatus is to make a cylinder of cast-iron, one of the heads of which may be removed or put on at pleasure, and to cause said cylinder to revolve on an axis, in the manner of a barrel-churn, over or with a furnace so constructed as that the cylinder with its contents may be brought to a cherry-red heat and kept so for half an hour, (more or less,) as experience may show to be necessary. Several such cylinders may be placed in a row and made to revolve by means of a winch or other adequate power. These vessels may be made to contain any quantity of the ore which is capable of being conveniently managed and for which no precise directions can be given. When these cylinders have been charged and placed in or over the furnace and have been made to revolve, as aforesaid, until they and their contents are sufficiently heated and the combination of the precious metal with the lead is believed to be complete, the cylinders may be removed from the fire and turned up on one end to allow the alloy to settle and to cool. The earthy matter may then be removed through a suitable opening in the cylinder and new material be substituted, to be again treated in the same way. In this manner the charges may be repeated until the lead has combined with such a portion of the precious metal or metals as may render it proper to separate the same. The quantity of charcoal, sal-ammoniac, or other flux, which is put into the vessel with the charge of ore, must be such as may be found necessary to preserve the lead from oxidation. The precise quantity is not a point of importance, and it is one which the practical chemist or operator will not find difficult to regulate. When the lead has become sufficiently charged with the precious metals or metal, it may be submitted to the process of expellation; or, instead of this, a large portion of the lead may be converted into a sulphuret by the addition of sulphur to the formed metal, and the operation of cupellation be thus much abridged. The oxide or sulphuret of lead thus obtained may be again reduced to the state of metallic lead by processes well known to the metallurgist or practical chemist.

*Of the apparatus.*—The nature of this part of my invention consists in supplying the gold or other ore in a pulverized state, or the gold or other metal mixed with sand or other foreign matter, and prepared, by mixture with pulverized charcoal or other like substance, through a central pipe in a rotating plate, so that the metal thus introduced will be supplied without atmospheric air, as the pressure of atmospheric air in any great quantity would be prejudicial to the process so far as to oxidize the lead employed in the process. The metal thus introduced is delivered onto the surface of lead, which is kept in a molten state in a vessel below, and gradually carried from the center toward the periphery by a series of teeth on the under surface of the top rotating plate, the molten lead taking up the gold and silver, and thus separating it from the ore, sand, or other foreign matter with which it was mixed when introduced, the action of the rotating plate gradually crowding or forcing the ore, sand, and other impurities out through an aperture or apertures at the periphery of the vessel containing the lead. After the lead has been sufficiently charged with gold or other metal thus separated it is drawn off to be submitted to the separating process, as above described.

In the accompanying drawings, *a* represents a circular vessel or pan, which is to be placed on any appropriate furnace, when in use, to keep the lead which it is to contain at the required temperature. This vessel is provided with radial wings *b*, which project upward from the bottom to prevent the molten lead from being carried around by the rotation of the machinery which acts on the ore. The lead is supplied to this vessel through the spout *c* and discharged through a stop-cock, *d*. On top of this vessel there is a circular plate, *e*, the arbor *f* of which runs in an appropriate box, *g*, in the cap-plate *h*, which is accurately fitted by flanges to the rim of the vessel *a*, so that when secured to it by clamps *i i* the two shall form an air-tight joint, or nearly so. The arbor *f* of the rotating plate runs on a pivot, *j*, in the center of the vessel *a*, and its upper end above the cap-plate is provided with a bevel-pinion, *k*, the cogs of which mesh into the cogs of a driving-wheel, *l*, on a horizontal shaft, *m*. A hole, *n*, passes through from the upper end of the arbor to the under surface of the rotating plate to deliver the ore, &c., as near the center of motion as possible, and as it is delivered it is gradually carried toward the periphery to be acted on by the entire surface of the lead for the purpose of taking up the gold or other metal to be separated and to discharge the refuse matter through an aperture, *o*, at the periphery, this outward or centrifugal action being effected by teeth *p*, that project downward from the under surface and arranged in radial rows, but with their faces so inclined to the radii as to correspond with curved lines starting from the periphery of the arbor and gradually approaching the periphery.

The ground ore or sand containing the gold or other metal to be separated is mixed with pulverized charcoal and placed in a funnel-shaped hopper, *q*, the spout *r* of which is a cylindrical tube fitted to the upper end of the hollow arbor of the rotating plate, and to this cylindrical tube is fitted a hollow piston, *s*, that has two apertures, one near the upper end and the other near the bottom. It is attached to the lower end of a rod, *t*, that slides in a guide-brace, *u*, which rod is embraced by the forked end of a lever, *v*, the other end of which is jointed to a rod, *w*, that receives a vertical reciprocating motion from a cam, *x*, on the shaft of the driving-wheel that acts on a tappet or tappets on the rod, so that by this arrangement of parts the piston is moved up and down. When up, it receives a charge of ore, &c., from the hopper through the upper hole, and when let down discharges it through the lower hole into a recess, *y*, in the inside of the arbor of the rotating plate, where it is left, by the upward motion of the piston, to be forced down onto the lead in the vessel below by the under surface of the piston at its next downward motion. By this means the vessel is supplied with the ore, &c., and the air excluded, and as the impurities are forced by the action of the machinery toward the delivery-aperture the air is prevented from entering and therefore the lead prevented from being wasted by oxidation.

I do not wish to confine myself to the precise arrangement of parts herein described, as the principle is susceptible of various minor modifications.

Having thus fully described the nature of my said improvement and the manner in which the same is to be carried into effect, I do hereby declare that what I claim as constituting my discovery and improvement in the art of separating the precious metals, and more particularly gold from its ores or from other admixtures of or combinations with foreign matter, and which discovery I desire to secure by Letters Patent, is—

1. The exposing of the said ore or ores or combination or admixture of the precious metals with foreign materials, together with metallic lead and charcoal, sal-ammoniac, or other flux in closed vessels in which the whole may be subjected to a red heat for the purpose of causing the precious metal or metals to combine with the metallic lead, instead of amalgamating the same with mercury, for the purpose and substantially in the manner set forth, without intending to confine myself to any particular mode of constructing the apparatus used, but to vary this as I may think proper, while the principle of operation remains unchanged and the same end is attained by analogous means.

2. In the apparatus, in combination with the vessel containing the molten lead, and provided with an aperture for the discharge of the impurities and another for the discharge of the lead, the rotating plate provided with the hollow arbor for the supply of the ore, &c., and with the teeth for carrying the ore toward the periphery, substantially as described.

3. The method, substantially as herein described, of charging the apparatus with the ore, &c., without admitting air, in combination with the method of carrying the ore, &c., through the apparatus and over the surface of the lead in the vessel, as described.

ISAAC BABBITT.

Witnesses:
CYRUS CUMMINGS,
EBEN SMITH, Jr.